United States Patent
Tawara et al.

(10) Patent No.: US 8,271,167 B2
(45) Date of Patent: Sep. 18, 2012

(54) SHIFT CONTROL APPARATUS FOR VEHICULAR CONTINUOUSLY VARIABLE TRANSMISSIONS

(75) Inventors: Masahiro Tawara, Toyota (JP); Shinya Toyoda, Nissin (JP); Tadashi Tamura, Nishikamo-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 495 days.

(21) Appl. No.: 12/526,104

(22) PCT Filed: Feb. 14, 2008

(86) PCT No.: PCT/IB2008/000851
§ 371 (c)(1),
(2), (4) Date: Aug. 6, 2009

(87) PCT Pub. No.: WO2008/099287
PCT Pub. Date: Aug. 21, 2008

(65) Prior Publication Data
US 2010/0100289 A1  Apr. 22, 2010

(30) Foreign Application Priority Data
Feb. 14, 2007 (JP) ................................. 2007-034072

(51) Int. Cl.
*G06F 7/00* (2006.01)
(52) U.S. Cl. ......................................... 701/52; 180/336
(58) Field of Classification Search ................... 180/336, 180/366; 701/52, 55
See application file for complete search history.

(56) References Cited

U.S. PATENT DOCUMENTS

| | | | |
|---|---|---|---|
| 6,363,805 B1 | 4/2002 | Marchart | |
| 6,553,856 B2* | 4/2003 | Svendsen | 74/335 |
| 6,671,602 B1* | 12/2003 | Speicher et al. | 701/52 |
| 6,821,228 B2* | 11/2004 | Aoki et al. | 477/44 |
| 7,367,922 B2* | 5/2008 | Gueter | 477/115 |
| 2004/0225430 A1* | 11/2004 | Bothe et al. | 701/52 |
| 2006/0131094 A1 | 6/2006 | Lankes et al. | |
| 2008/0208419 A1* | 8/2008 | Wolf et al. | 701/52 |

FOREIGN PATENT DOCUMENTS

| | | |
|---|---|---|
| DE | 32 01 440 A1 | 9/1983 |
| GB | 2 328 480 A | 2/1999 |
| JP | 09-229185 A | 9/1997 |
| JP | 2000-283281 A | 10/2000 |
| JP | 2006-97789 A | 4/2006 |
| WO | 2004/081417 A2 | 9/2004 |
| WO | 2005/121605 A1 | 12/2005 |

OTHER PUBLICATIONS

European Office Action for corresponding European Patent Application EP 08719436.1 issued on Nov. 26, 2010.

* cited by examiner

*Primary Examiner* — Mark Hellner
(74) *Attorney, Agent, or Firm* — Sughrue Mion, PLLC

(57) ABSTRACT

A shift control apparatus for vehicular continuously variable transmissions is equipped with a related value calculating portion (102) that calculates a first driving force related value in association with an automatic shift mode in which an automatic shift control portion (92) performs shift control and that calculates a second driving force related value in association with a manual shift mode in which a manual shift control portion (94) performs shift control, and a second changeover portion (108). The first driving force related value and the second driving force related value are set larger as the driving force output from an engine (12) increases. The second changeover portion makes a changeover from the manual shift mode to the automatic shift mode on the basis of a relationship between the first driving force related value and the second driving force related value.

16 Claims, 15 Drawing Sheets

SHIFT CONTROL APPARATUS FOR VEHICULAR CONTINUOUSLY VARIABLE TRANSMISSIONS

BACKGROUND OF THE INVENTION

1. Field of the Invention

The invention relates to a shift control apparatus for vehicular continuously variable transmissions and, more particularly, to a shift control apparatus for performing in an improved manner changeover control from a manual shift mode, in which changes in change gear ratio are made stepwise in accordance with an operation by a driver, to an automatic shift mode.

2. Description of the Related Art

Japanese Patent Application Publication No. 2006-97789 (JP-A-2006-97789) describes a shift control apparatus for vehicular continuously variable transmissions that has a continuously variable transmission disposed between a running power source and driven wheels and designed to allow continuous changes in change gear ratio, and manual shift control means for changing the change gear ratio of the continuously variable transmission in accordance with an operation by a driver among a plurality of change gear ratios set stepwise in advance. According to this art, a temporary manual shift mode, in which the change gear ratio of the continuously variable transmission is changed stepwise to any one of the plurality of the change gear ratios designated in advance in response to a manual shift operation by the driver, is realized. Also, when one of cancellation conditions that the acceleration of a vehicle remain equal to or lower than a predetermined acceleration for a predetermined time or more, that an accelerator pedal remain open for a predetermined time or more, and that the speed of the vehicle be equal to or lower than a predetermined speed is fulfilled, the above-mentioned temporary manual shift mode is canceled and changed over to an automatic shift mode. A changeover from the manual shift mode to the automatic shift mode can thereby be made desirably without causing the driver a sense of incongruity.

In the aforementioned art, however, the vehicle may not be accelerated as intended by the driver owing to hold control of a shift stage (change gear ratio) when the driver depresses the accelerator pedal while running in the temporary manual shift mode. Therefore, there are demands for the development of a shift control apparatus for vehicular continuously variable transmissions that performs changeover control from a manual shift mode to an automatic shift mode in accordance with an accelerating intention of a driver.

SUMMARY OF THE INVENTION

The invention provides a shift control apparatus for vehicular continuously variable transmissions that performs changeover control from a manual shift mode to an automatic shift mode in accordance with an accelerating intention of a driver.

One aspect of the invention provides a shift control apparatus for vehicular continuously variable transmissions that includes a continuously variable transmission provided in a driving force transmission path between a running power source and driven wheels to continuously change a change gear ratio; a manual shift control portion that changes the change gear ratio of the continuously variable transmission among a plurality of shift stages set stepwise in advance; an automatic shift control portion that changes the change gear ratio of the continuously variable transmission on the basis of a running state of a vehicle; a first changeover portion that makes, in accordance with an operation by the driver, a changeover from an automatic shift mode in which the automatic shift control portion performs shift control to a manual shift mode in which the manual shift control portion performs shift control; a second changeover portion that makes a changeover from the manual shift mode to the automatic shift mode; and a related value calculating portion that calculates a first driving force related value in association with the automatic shift mode and a second driving force related value in association with the manual shift mode. The first driving force related value and the second driving force related value are set larger as a driving force output from the running power source increases. The second changeover portion makes a changeover from the manual shift mode to the automatic shift mode on the basis of a relationship between the first driving force related value and the second driving force related value.

According to the aspect of the present invention, the related value calculating portion that calculates the first and second driving force related values that are set larger as the driving force output from the power source increases is installed, and the second changeover portion performs changeover control from the manual shift mode to the automatic shift mode on the basis of the relationship between the first driving force related value and the second driving force related value. In this manner, therefore, the manual shift mode can be automatically canceled and changed over to the automatic shift mode on the basis of the driving force related values, which reflect an accelerating intention of the driver. In other words, the shift control apparatus for vehicular continuously variable transmissions that performs changeover control from the manual shift mode to the automatic shift mode in accordance with the accelerating intention of the driver can be provided.

In this case, the second changeover portion may perform changeover control from the manual shift mode to the automatic shift mode when the first driving force related value is larger than the second driving force related value. In this manner, practical changeover control from the manual shift mode to the automatic shift mode can be performed in accordance with the accelerating intention of the driver.

The second changeover portion may make a changeover from the manual shift mode to the automatic shift mode when the first driving force related value is larger than the second driving force related value, which corresponds to a shift stage that is lower than a current shift stage in the manual shift mode by at least one stage. In this manner, practical changeover control from the manual shift mode to the automatic shift mode can be performed in accordance with the accelerating intention of the driver.

The second changeover portion may perform changeover control from the manual shift mode to the automatic shift mode when the first driving force related value is larger than the second driving force related value by a predetermined value. In this manner, practical changeover control from the manual shift mode to the automatic shift mode can be performed in accordance with the accelerating intention of the driver.

The predetermined value may be set on the basis of a running state of the vehicle. In this manner, a condition for making a changeover from the manual shift mode to the automatic shift mode can be desirably designated.

The driving force related values may be target rotational speeds of the running power source. In this manner, a condition for making a changeover from the manual shift mode to the automatic shift mode can be desirably designated.

BRIEF DESCRIPTION OF THE DRAWINGS

The foregoing and further objects, features and advantages of the invention will become apparent from the following description of an example embodiment with reference to the accompanying drawings, wherein like numerals are used to represent like elements and wherein.

DETAILED DESCRIPTION OF EMBODIMENT

An embodiment of the invention will be described hereinafter in detail on the basis of the drawings.

Figure 1:
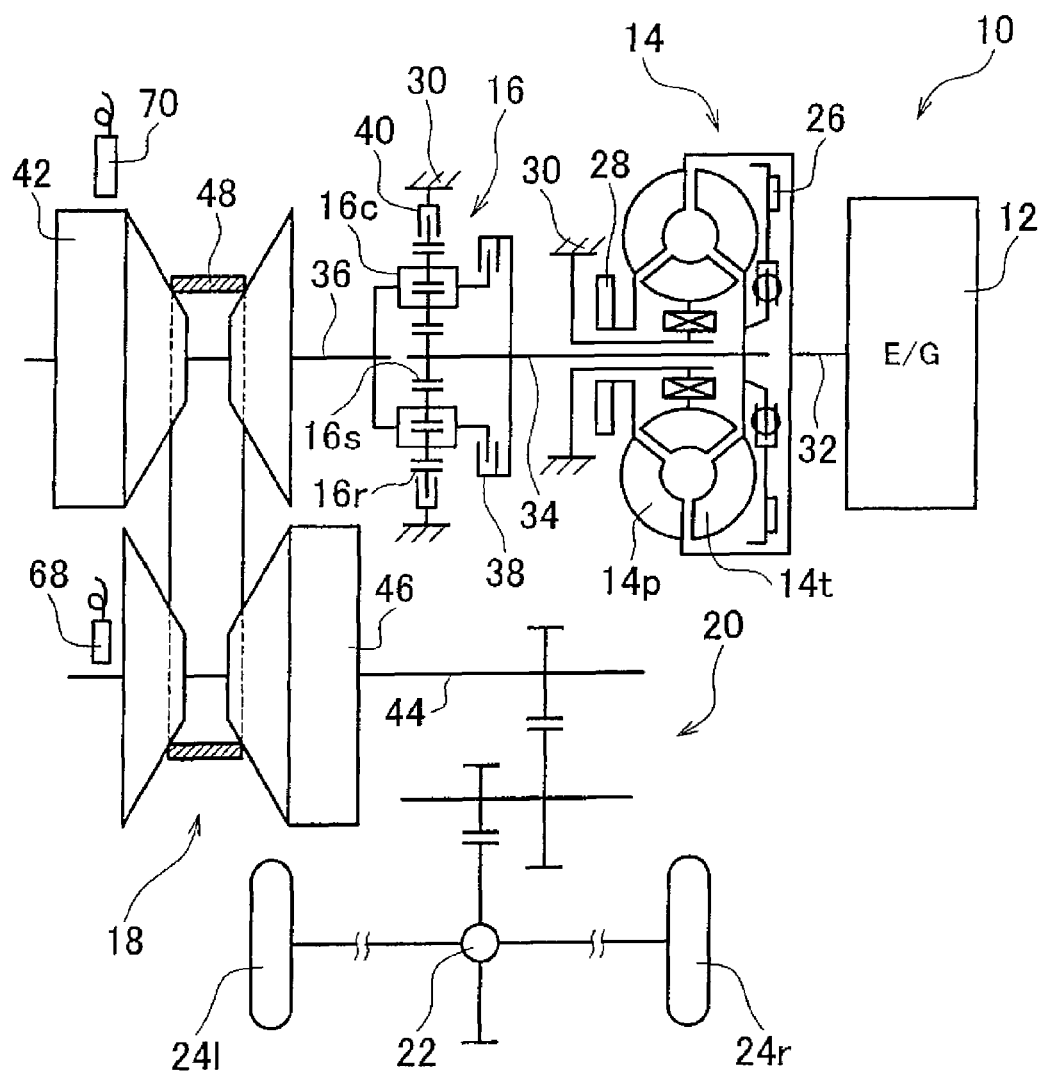
FIG. 1 is an outline diagram of a vehicular driving mechanism to which a shift control apparatus according to the embodiment of the invention is applied.

FIG. 1 is an outline diagram of a vehicular driving mechanism 10 to which a shift control apparatus according to the embodiment of the invention is applied. This vehicular driving mechanism 10 is adopted in a front-engine front-drive (FF) vehicle, and is equipped with an engine 12 functioning as a running power source. This engine 12 is an internal combustion engine for burning a predetermined type of fuel to output power, for example, a gasoline engine, a diesel engine, or the like. A driving force output from the engine 12 is transmitted to a differential gear mechanism 22 via a torque converter 14, a forward/backward changeover device 16, a belt-type continuously variable transmission (CVT) 18, and a reduction gear 20, and is distributed to a right driven wheel 24r and a left driven wheel 24l (which will be referred to hereinafter simply as the driven wheels 24 when no particular distinction is made therebetween).

The torque converter 14 is equipped with a turbine impeller 14t coupled to the forward/backward changeover device 16 via a pump impeller 14p and a turbine shaft 34, which are coupled to a crankshaft 32 of the engine 12. The torque converter 14 is a hydraulic power transmission device for transmitting power via a fluid. A lockup clutch 26 is provided between the pump impeller 14p and the turbine impeller 14t. The pump impeller 14p and the turbine impeller 14t are coupled to each other by the lockup clutch 26 to rotate integrally. The pump impeller 14p is provided with a mechanical oil pump 28 for generating an oil pressure for performing shift control by the continuously variable transmission 18, an oil pressure for generating a belt clamping force, and an oil pressure for supplying lubricating oil to respective portions of the vehicular driving mechanism 10.

The forward/backward changeover device 16 is constructed as a double pinion-type planetary gear train. The turbine shaft 34 of the torque converter 14 is coupled to a sun gear 16s constituting part of the forward/backward changeover device 16, and an input shaft 36 of the continuously variable transmission 18 is coupled to a carrier 16c. A direct-coupled clutch 38 is disposed between the carrier 16c and the sun gear 16s. When the direct-coupled clutch 38 is engaged, the forward/backward changeover device 16 is caused to rotate integrally, and the turbine shaft 34 is directly coupled to the input shaft 36. As a result, a driving force in a forward running direction is transmitted to each of the driven wheels 24. When a reactive brake 40 disposed between a ring gear 16r and a housing 30 is engaged and the direct-coupled clutch 38 is released, the input shaft 36 is caused to rotate reversely with respect to the turbine shaft 34. As a result, a driving force in a backward running direction is transmitted to each of the driven wheels 24. When both the direct-coupled clutch 38 and the reactive brake 40 are released, the transmission of power between the engine 12 and the continuously variable transmission 18 is shut off. In this case, both the direct-coupled clutch 38 and the reactive brake 40 are preferably designed as hydraulic frictional engagement devices.

The continuously variable transmission 18 is equipped with an input-side variable pulley 42 with a variable V-groove width that is coupled to the input shaft 36 to be rotated integrally therewith, an output-side variable pulley 46 with a variable V-groove width that is coupled to an output shaft 44 to be rotated integrally therewith, and a driving belt 48 wound around the variable pulleys 42 and 46. Power is transmitted via frictional forces acting between the variable pulleys 42 and 46 and the driving belt 48. The variable pulleys 42 and 46 are equipped with hydraulic cylinders for changing the V-groove widths thereof respectively. The V-groove widths of both the variable pulleys 42 and 46 change through the control of the oil pressure in the hydraulic cylinder of the input-side variable pulley 42 by a shift control circuit 50 (see FIG. 2). In consequence, the hanging diameter (effective diameter) of the driving belt 48 is changed, and continuous changes in a change gear ratio γ (=input shaft rotational speed NIN/output shaft rotational speed NOUT) are made. The oil pressure in the hydraulic cylinder of the output-side variable pulley 46 is controlled through regulation in accordance with an input torque and the change gear ratio γ by a clamping force control circuit 52 (see FIG. 2) so as not to cause slippage of the driving belt 48.

Figure 2:
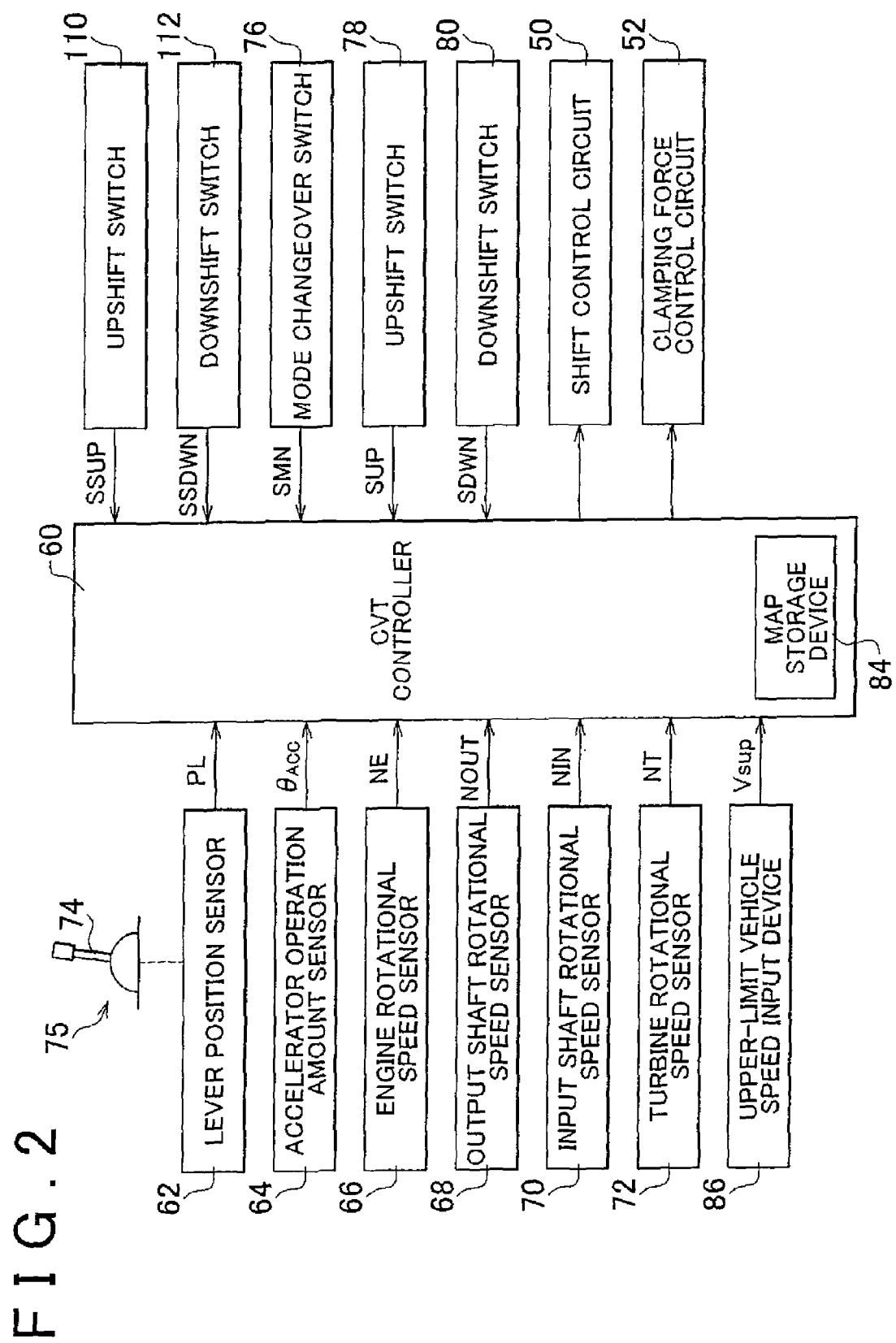
FIG. 2 is a block diagram for explaining a control system of a continuously variable transmission in the vehicular driving mechanism of FIG. 1.

FIG. 2 is a diagram exemplifying a CVT controller 60 with which the vehicular driving mechanism 10 is equipped to control the continuously variable transmission 18. This CVT controller 60 includes a microcomputer having a CPU, a RAM, a ROM, an input/output interface, and the like. The CPU performs signal processings according to programs stored in advance in the ROM while making use of a temporary storage function of the RAM, thereby performing shift control, belt clamping force control, and the like of the continuously variable transmission 18. Signals indicating a lever position PL of a shift lever 74 in a shift operation device 75, an operation amount $\theta_{ACC}$ of an accelerator pedal, an engine rotational speed NE, an output shaft rotational speed NOUT (which corresponds to a vehicle speed V), an input shaft rotational speed NIN, and a turbine rotational speed NT are supplied to the CVT controller 60 from a lever position sensor 62, an accelerator operation amount sensor 64, an engine rotational speed sensor 66, an output shaft rotational speed sensor 68, an input shaft rotational speed sensor 70, and a turbine rotational speed sensor 72 respectively. In addition, a manual shift mode selection signal SMN, upshift signals SUP and SSUP, and downshift signals SDWN and SSDWN are supplied to the CVT controller 60 from a mode changeover switch 76, upshift switches 78 and 110, downshift switches 80 and 112 respectively. It should be noted herein that the accelerator operation amount $\theta_{ACC}$ corresponds to an amount of an output required by the driver, that is, a required amount of a driving force output from the engine 12. An upper-limit vehicle speed input device 86 supplies an upper-limit vehicle speed $V_{sup}$ (km/h), which is input by the driver and represents an upper limit of the vehicle speed envisaged by the driver, to the CVT controller 60. This upper-limit vehicle speed input device 86 is designed as, for example, a numeric keypad or the like, which is provided in the form of software on a touch panel display unit in a car navigation system (not shown) mounted on the vehicle.

Figure 3:
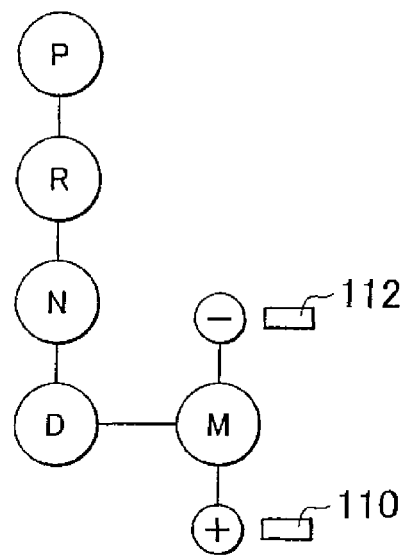
FIG. 3 is a diagram showing a shift pattern of a shift lever of FIG. 2.

The shift operation device 75 has, for example, the shift lever 74 subjected to a changeover operation by the driver, and is disposed beside a driver seat or the like. For example, as shown in FIG. 3, the shift operation device 75 is equipped in a longitudinal direction of the vehicle with lever positions PL, namely, a P position for parking, an R position for running backward, an N position for shutting off the transmission of power, and a D position for running forward while making automatic shifts using all shift ranges of the continuously variable transmission 18. In addition, an M position for selecting a manual shift mode is set beside the D position, and a "+" position for upshift and a "−" position for downshift are provided in front of and behind the M position respectively. The shift lever 74 is designed to be operable in a tilting manner from the M position to the "+" position and the "−" position, and to be automatically returned to the M position by a spring or the like. An operation of the shift lever 74 to the M position is detected by the lever position sensor 62, and a changeover to the manual shift mode is thereby made. Tilting operations of the shift lever 74 to the "+" position and the "−" position are detected by the upshift switch 110 and the downshift switch 112, and an upward change in shift stage and a downward change in shift stage are thereby made respectively.

The D position is a position for selecting the automatic shift mode in which the change gear ratio γ of the continuously variable transmission 18 is automatically and continuously changed. The M position is a position for selecting the manual shift mode in which the change gear ratio γ of the continuously variable transmission 18 is changed stepwise in accordance with an upward/downward operation by the driver. When a movement of the shift lever 74 from the D position to the M position is detected by the lever position sensor 62 and a lever position signal PL is sent to the CVT controller 60, the CVT controller 60 makes a changeover from the automatic shift mode to the manual shift mode. When a tilting movement of the shift lever 74 to the "+" position is detected by the upshift switch 110, the upshift signal SSUP is output to make an upward change in shift stage by one stage. When a tilting movement of the shift lever 74 to the "−" position is detected by the downshift switch 112, the downshift signal SSDWN is output to make a downward change in shift stage by one stage. Shift control in this manual shift mode will be described later using FIG. 7 and the like.

Figure 4:
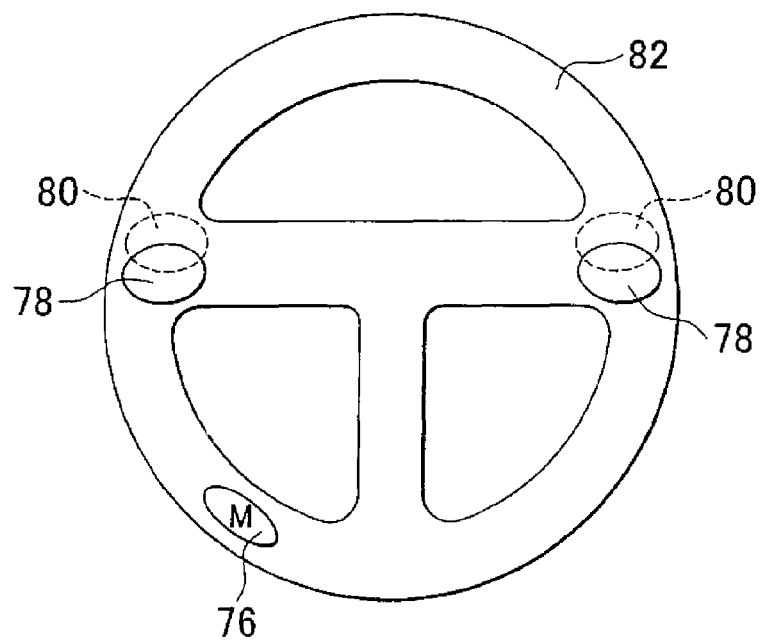
FIG. 4 is a diagram for explaining a mode changeover switch and the like disposed on a steering wheel.

The mode changeover switch 76, the upshift switches 78, and the downshift switches 80 are preferably provided on a steering wheel 82 in the driver seat as shown in FIG. 4. The mode changeover switch 76 serves to make a changeover between the automatic shift mode in which the change gear ratio γ of the continuously variable transmission 18 is automatically and continuously changed and the manual shift mode in which the change gear ratio γ of the continuously variable transmission 18 is changed stepwise in accordance with an upward/downward operation by the driver. The mode changeover switch 76 is turned ON/OFF every time by being operated in a push-in manner. The manual shift mode selection signal SMN is output when the mode changeover switch 76 is turned ON. The upshift switches 78 and the downshift switches 80 serve to perform an upward operation of shift stage and a downward operation of shift stage respectively during the manual shift mode. A pair of the upshift switches 78 and a pair of the downshift switches 80 are provided on the steering wheel 82 in a left region thereof and a right region thereof respectively. The upshift switches 78 are disposed on a front side (driver side) of the steering wheel 82, and the downshift switches 80 are disposed on a back side of the steering wheel 82. These upshift switches 78 and these downshift switches 80 are designed as automatic recovery-type switches. Every time each of the upshift switches 78 or each of the downshift switches 80 is operated in a push-in manner, the upshift signal SUP or the downshift signal SDWN is output to make an upward change or a downward change in shift stage by one stage.

Figure 5:
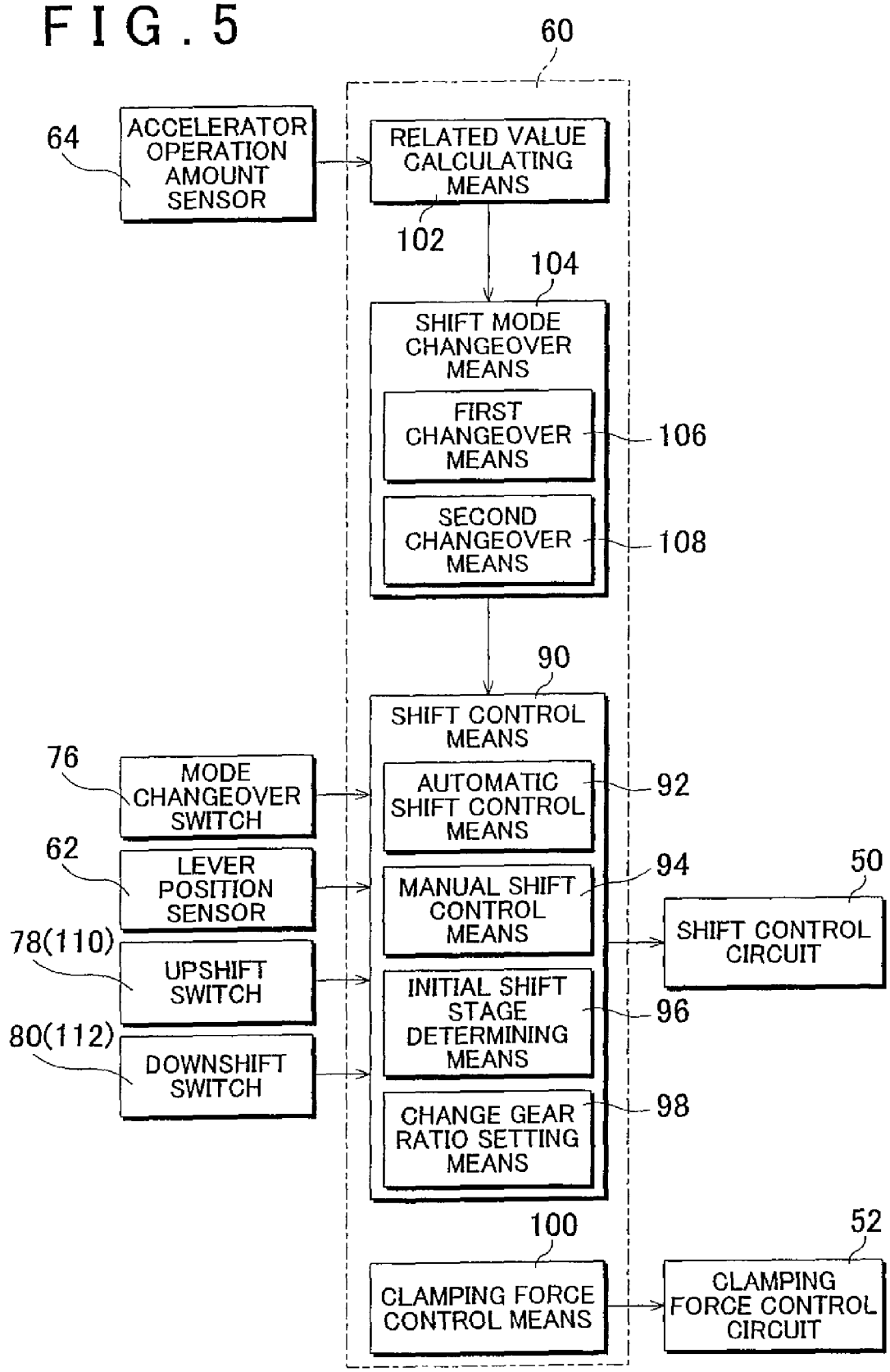
FIG. 5 is a block diagram for explaining the functions with which a CVT controller of FIG. 2 is endowed.

FIG. 5 is a functional block diagram for explaining an essential part of control functions with which the CVT controller 60 is endowed. Shift control means 90 shown in this FIG. 5 controls the change gear ratio γ of the continuously variable transmission 18. More specifically, the shift control means 90 controls the oil pressure in the hydraulic cylinder of the input-side variable pulley 42 via the shift control circuit 50 to change the V-groove widths of both the variable pulleys 42 and 46, thereby changing the hanging diameter (effective diameter) of the driving belt 48 and causing continuous changes in the change gear ratio γ (=the input shaft rotational speed NIN/the output shaft rotational speed NOUT). To perform shift control in the automatic shift mode and shift control in the manual shift mode, the shift control means 90 is equipped with automatic shift control means 92, manual shift control means 94, initial shift stage determining means 96, and change gear ratio setting means 98.

Shift mode changeover means 104 determines, on the basis of signals supplied from the lever position sensor 62 and the mode changeover switch 76, whether the continuously variable transmission 18 is in the automatic shift mode or the manual shift mode, and suitably makes a changeover between the automatic shift mode and the manual shift mode. To perform this mode changeover control, the shift mode changeover means 104 is equipped with first changeover means 106 for performing changeover control from the automatic shift mode to the manual shift mode in accordance with an operation of the mode changeover switch 76 or the like, and second changeover means 108 for performing changeover control from the manual shift mode to the automatic shift mode when a predetermined condition is fulfilled as will be described later.

Figure 6:
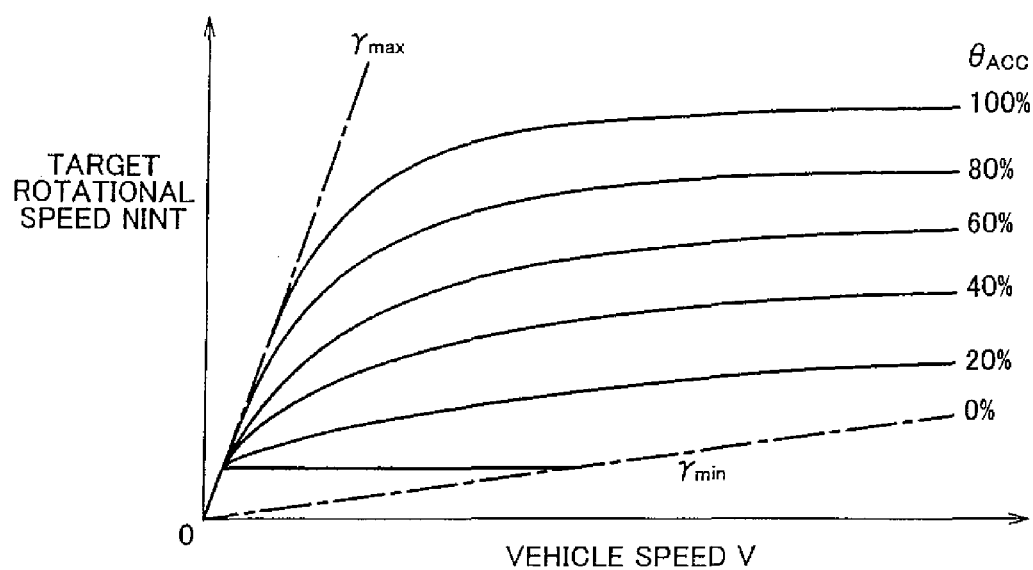
FIG. 6 is a diagram showing an example of an automatic shift map for calculating a target rotational speed on an input side in accordance with an operational state when automatic shift means of FIG. 5 performs automatic shift control.

When the shift mode changeover means 104 determines in response to an operation of the shift lever 74 to the D position that the automatic shift mode has been established, the automatic shift control means 92 performs shift control of automatically and continuously changing the change gear ratio $\gamma$ of the continuously variable transmission 18 in accordance with an operational state of the vehicle. For example, the automatic shift control means 92 calculates from an automatic shift map shown in FIG. 6 a target rotational speed NINT on an input side on the basis of an accelerator operation amount $\theta_{ACC}$, which indicates an amount of an output required by the driver, and the vehicle speed V (which corresponds to the output shaft rotational speed NOUT), and performs shift control of the continuously variable transmission 18 in accordance with a difference between the actual input shaft rotational speed NIN and the target rotational speed NINT such that the actual input shaft rotational speed NIN coincides with the target rotational speed NINT. More specifically, the automatic shift control means 92 performs feedback control of an electromagnetic open/close valve (not shown) or the like, which is incorporated in the shift control circuit 50, to control the supply/discharge of a working fluid to/from the hydraulic cylinder of the input-side variable pulley 42. The map of FIG. 6 corresponds to a shift condition, and is designed to set the target rotational speed NINT such that the change gear ratio $\gamma$ increases as the vehicle speed V decreases and as the accelerator operation amount $\theta_{ACC}$ increases. The vehicle speed V corresponds to the output shaft rotational speed NOUT. The target rotational speed NINT as a target value of the input shaft rotational speed NIN corresponds to a target change gear ratio, and is designated within a range between a minimum change gear ratio $\gamma_{min}$ and a maximum change gear ratio $\gamma_{max}$ of the continuously variable transmission 18. The automatic shift map shown in FIG. 6 is stored in advance in a map storage device 84, for example, the ROM installed in the CVT controller 60.

Figure 7:
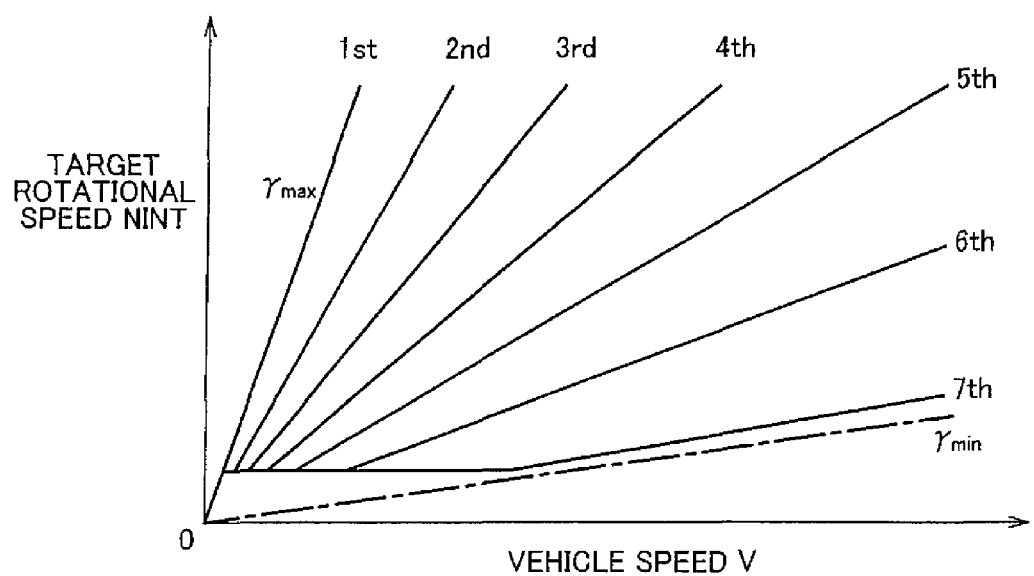
FIG. 7 is a diagram showing an example of a manual shift map for calculating a target rotational speed at each shift stage in accordance with a vehicle speed when manual shift means of FIG. 5 performs manual shift control.

The manual shift control means 94 performs shift control of changing the change gear ratio $\gamma$ of the continuously variable transmission 18 stepwise among a plurality of shift stages in accordance with an upward/downward operation by the driver such that the change gear ratio $\gamma$ becomes equal to a predetermined change gear ratio designated for each of the shift stages, when the shift mode changeover means 104 determines, in response to detection of an operation of the shift lever 74 from the D position to the M position by the lever position sensor 62 or the supply of the mode changeover signal SMN resulting from the pressing down of the mode changeover switch 76, that the manual shift mode has been established. For the sake of shift control by this manual shift control means 94, as shown in, for example, a manual shift map of FIG. 7, seven shift stages, namely, a first (1st) shift stage, a second (2nd) shift stage, a third (3rd) shift stage, a fourth (4th) shift stage, a fifth (5th) shift stage, a sixth (6th) shift stage, and a seventh (7th) shift stage are designated, and shift stage lines of the target rotational speed NINT on the input side are set for the shift stages respectively using the vehicle speed V as a parameter. This target rotational speed NINT corresponds to a target change gear ratio. In this embodiment of the invention, a series of a plurality of change gear ratios corresponding to the shift stages respectively are set in a staged manner as in the case of a multiple stage transmission, and the target rotational speed NINT is substantially rectilinearly designated for the vehicle speed V such that those change gear ratios become constant respectively. When the upshift signals SSUP and SUP or the downshift signals SSDWN and SDWN are supplied in response to an operation of the shift lever 74 to the "+" position or the "−" position or a pressing operation of the upshift switches 78 or the downshift switches 80, the manual shift control means 94 shifts up or down a shift stage, and changes the target rotational speed NINT, namely, the change gear ratio $\gamma$ stepwise in accordance with the shift stage, according to the manual shift map of FIG. 7. The manual shift map shown in FIG. 7 is stored in advance in the map storage device 84, for example, as a basic shift map. It should be noted that a plurality of types of maps such as a manual shift map oriented toward running performance, a manual shift map oriented toward fuel consumption, a manual shift map for engine brake, and the like may be stored as basic shift maps.

Figure 8:
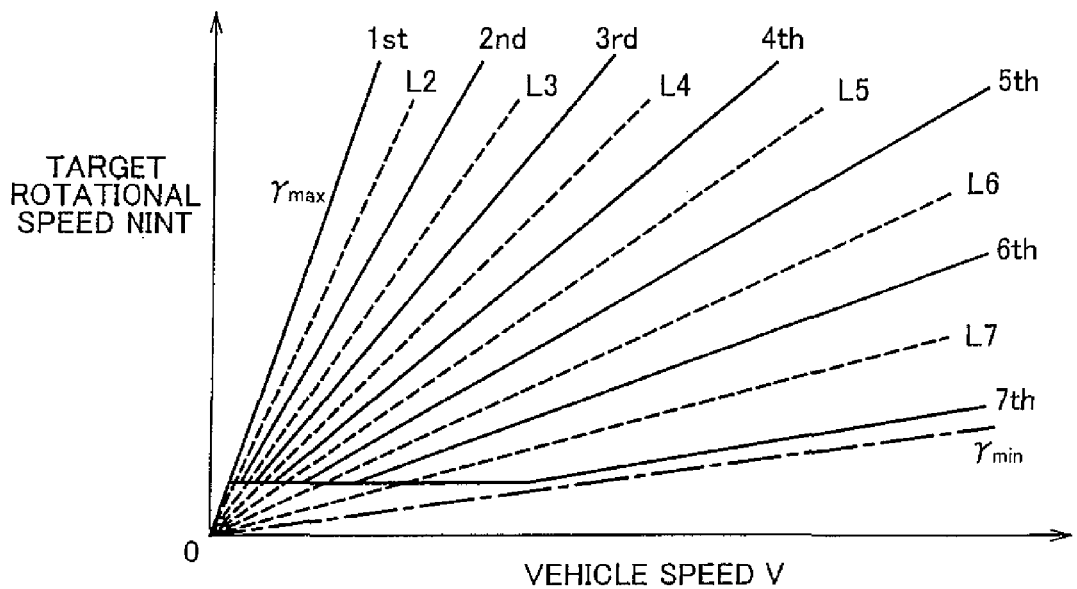
FIG. 8 is a diagram showing an example of an initial shift stage determining map used in setting an initial shift stage.

The initial shift stage determining means 96 determines that one of the plurality of the shift stages "1st" to "7th" which is to be established first according to, for example, an initial shift stage determining map shown in FIG. 8, when the shift mode changeover means 104 determines, in response to a changeover to the manual shift mode resulting from an operation of the shift lever 74 to the M position during running in the automatic shift mode by the automatic shift means 92 with the shift lever 74 held at the D position, that the manual shift mode has been established. Broken lines in this FIG. 8 constitute the initial shift stage determining map. A plurality of determination lines L2 to L7 are all designated in association with a plurality of shift stage lines (solid lines) of the continuously variable transmission 18 respectively, using the target rotational speed NINT and the vehicle speed V, which correspond to the change gear ratio $\gamma$ before a changeover in mode, as parameters. For example, the target rotational speed NINT is calculated from the aforementioned automatic shift map of FIG. 6 on the basis of the vehicle speed V and the accelerator operation amount $\theta_{ACC}$ as values immediately before a changeover to the manual shift mode. The seventh shift stage "7th" is selected when the calculated target rotational speed NINT is lower than the determination line L7 in FIG. 8 (below the determination line L7 in FIG. 8). The sixth shift stage "6th" is selected when the calculated target rotational speed NINT is lower than the determination line L6 and equal to or higher than L7 (in a region surrounded by the determination lines L6 and L7 or on L7 in FIG. 8). The fifth shift stage "5th" is selected when the calculated target rotational speed NINT is lower than the determination line L5 and equal to or higher than L6 (in a region surrounded by the determination lines L5 and L6 or on L6 in FIG. 8). The fourth shift stage "4th" is selected when the calculated target rotational speed NINT is lower than the determination line L4 and equal to or higher than L5 (in a region surrounded by the determination lines L4 and L5 or on L5 in FIG. 8). The third shift stage "3rd" is selected when the calculated target rotational speed NINT is lower than the determination line L3 and equal to or higher than L4 (in a region surrounded by the determination lines L3 and L4 or on L4 in FIG. 8). The second shift stage "2nd" is selected when the calculated target rotational speed NINT is lower than the determination line L2 and equal to or higher than L3 (in a region surrounded by the determination lines L2 and L3 or on L3 in FIG. 8). The first shift stage "1st" is selected when the calculated target rotational speed NINT is equal to or higher than L2 (on or above the determination line L2 in FIG. 8). This initial shift stage determining map corresponds to an initial shift stage determining condition. The initial shift stage determining map is designated in advance in accordance with the character of the vehicle, the purpose of manual shift, and the like, and stored in, for example, the map storage device 84.

The change gear ratio setting means 98 changes the change gear ratio at each of the shift stages when shift control is performed in the manual shift mode by the manual shift means 94. For example, the change gear ratio setting means 98 sets a gradient of a line representing the target rotational speed NINT on the input side, which has the vehicle speed V at each of the shift stages as a parameter in the aforementioned manual shift map shown in FIG. 7, on the basis of the upper-limit vehicle speed $V_{sup}$ input by the upper-limit vehicle speed input device 86, and changes the change gear ratio to a value corresponding to the upper-limit vehicle speed $V_{sup}$.

Figure 9:
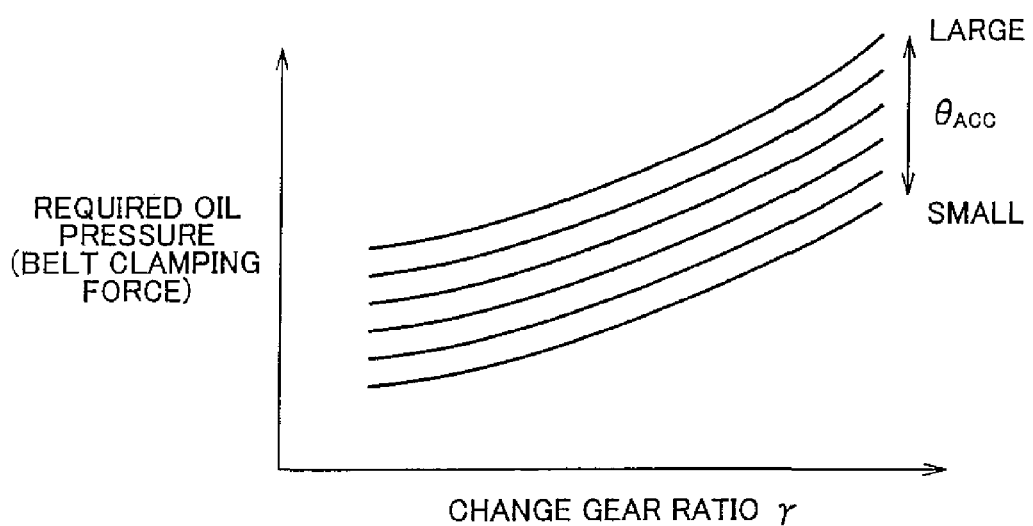
FIG. 9 is a diagram showing an example of a required oil pressure map for calculating a required oil pressure in accordance with a change gear ratio or the like when clamping force control means of FIG. 5 performs clamping force control of a belt-type continuously variable transmission.

The clamping force control means 100 controls the clamping force of the driving belt 48 in the continuously variable transmission 18. More specifically, the clamping force control means 100 controls the oil pressure supplied to the hydraulic cylinder mounted on the output-side variable pulley 46 and thereby causes changes in belt clamping force so as not to cause slippage of the driving belt 48. For example, the clamping force control means 100 controls a linear solenoid valve (not shown) incorporated in the clamping force control circuit 52 or the like according to a required oil pressure map of FIG. 9, thereby controlling through regulation the oil pressure in the hydraulic cylinder of the output-side variable pulley 46 installed in the continuously variable transmission 18. The required oil pressure map shown in FIG. 9 indicates a required oil pressure (which corresponds to a belt clamping force) that is designated in advance so as not to cause slippage of the belt using the accelerator operation amount $\theta_{ACC}$ and the change gear ratio $\gamma$, which correspond to a transmitted torque, as parameters. The required oil pressure map of FIG. 9 is stored in advance in, for example, the map storage device 84.

The related value calculating means 102 calculates, as to a driving force output from the engine 12 serving as a power source, driving force related values as parameters that are set larger as the driving force increases. Each of these driving force related values is preferably the target rotational speed NET as a target value of the rotational speed NE of the engine 12. The related value calculating means 102 calculates the target rotational speed NET of the engine 12 as a driving force related value on the basis of a relationship designated in advance and the accelerator operation amount $\theta_{ACC}$ detected by the accelerator operation amount sensor 64 (or an accelerator opening degree, an electronic throttle valve opening degree, or the like as a value corresponding to the accelerator operation amount $\theta_{ACC}$). The relationship designated in advance to calculate this target rotational speed NET may be individually designated in association with each of shift control in the automatic shift mode by the automatic shift control means 92 and shift control in the manual shift mode by the manual shift control means 94. For example, the map shown in FIG. 6 may be used in the automatic shift mode, and the map shown in FIG. 7 may be used in the manual shift mode.

That is, the related value calculating means 102 individually calculates target rotational speeds NET1 and NET2 of the engine 12 as driving force related values in association with shift control in the automatic shift mode and shift control in the manual shift mode respectively.

Figure 10:
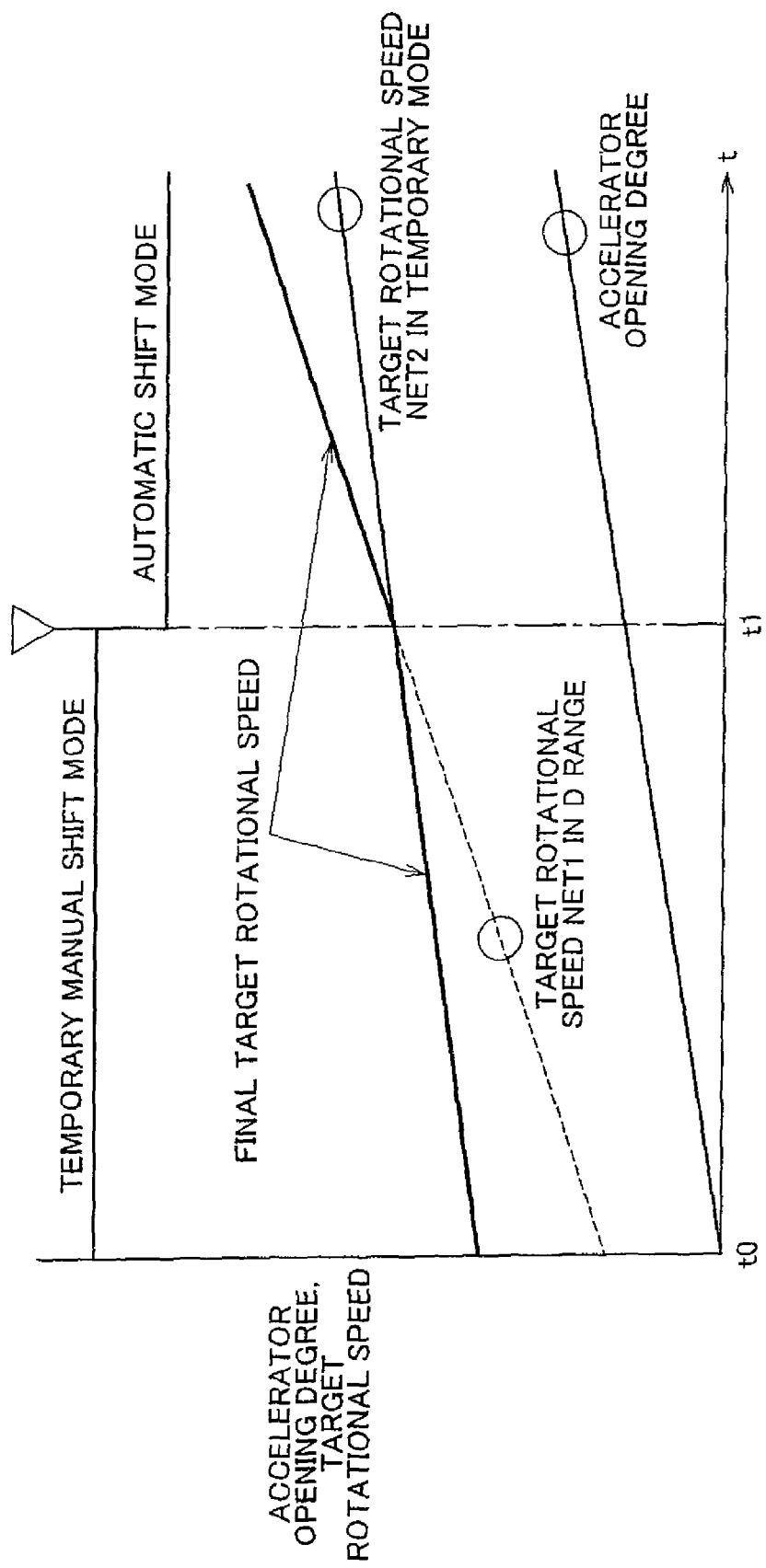
FIG. 10 is a time chart for explaining changeover control from a manual shift mode to an automatic shift mode by the CVT controller of FIG. 2.

In this case, the second changeover means 108 performs changeover control from the manual shift mode to the automatic shift mode on the basis of a relationship between the target rotational speed NET1 as a first driving force related value calculated by the related value calculating means 102 in association with the automatic shift mode and the target rotational speed NET2 as a second driving force related value calculated by the related value calculating means 102 in association with the manual shift mode. The second changeover means 108 performs changeover control from the manual shift mode to the automatic shift mode preferably when the first target rotational speed NET1 is higher than the second target rotational speed NET2. FIG. 10 is a time chart for explaining changeover control from the manual shift mode to the automatic shift mode by the second changeover means 108. At a time point t0 shown in this FIG. 10, the continuously variable transmission 18 is in a state in which the manual shift control means 94 performs shift control, namely, in a temporary manual shift mode. At this stage, the second target rotational speed NET2 is higher than the first target rotational speed NET1. A relationship in magnitude between these target rotational speeds NET1 and NET2 turns around at a time point t1. After the time point t1, the first target rotational speed NET1 is higher than the second target rotational speed NET2. The second changeover means 108 performs changeover control from the manual shift mode to the automatic shift mode (the D range) when the first target rotational speed NET1 becomes higher than the second target rotational speed NET2 at the time point t1. Thus, a higher target rotational speed is set as a reflection of an accelerating intention of the driver, and hence, shift control such as downshift or the like can be performed.

Figure 11:
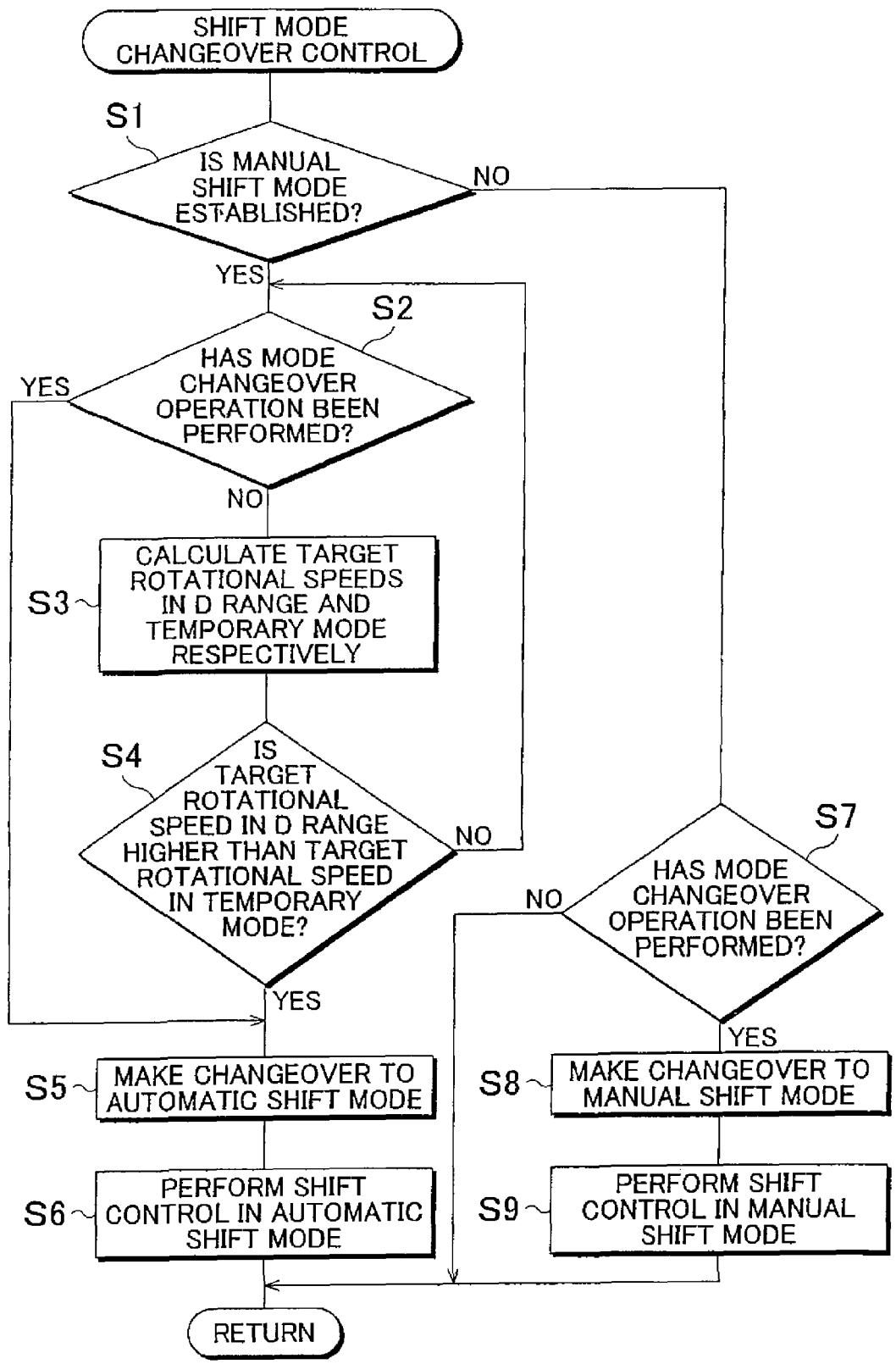
FIG. 11 is a flowchart for explaining an essential part of shift mode changeover control (control corresponding to the time chart of FIG. 10) by the CVT controller of FIG. 2.

FIG. 11 is a flowchart for explaining an essential part of shift mode changeover control (control corresponding to the time chart of FIG. 10) by the CVT controller 60. This shift mode changeover control is repeatedly performed at intervals of a predetermined period.

First of all in step (the term "step" will be omitted hereinafter) S1, it is determined whether or not a shift mode at a relevant time point is the manual shift mode. When this determination in S1 is negative, namely, when it is determined that the shift mode is the automatic shift mode, processings starting from S7 are performed. On the other hand, when the determination in S1 is positive, it is determined in S2 whether or not an operation of a changeover from the manual shift mode to the automatic shift mode has been performed via the shift lever 74, the mode changeover switch 76, or the like. When this determination in S2 is positive, processings starting from S5 are performed. On the other hand, when the determination in S2 is negative, the first engine target rotational speed NET1 corresponding to the automatic shift mode and the second engine target rotational speed NET2 corresponding to the manual shift mode are calculated in S3, which corresponds to the action of the related value calculating means 102. It is then determined in S4 whether or not the first engine target rotational speed NET1 calculated in S3 is higher than the second engine target rotational speed NET2. When this determination in S3 is negative, processings starting from S2 are performed again. On the other hand, when the determination in S4 is positive, changeover control from the manual shift mode to the automatic shift mode is performed in S5, which corresponds to the action of the second changeover means 108. Then, after shift control in the aforementioned automatic shift mode is started in S6, which corresponds to the action of the automatic shift control means 92, the present routine is terminated. It is determined in S7 whether or not an operation of a changeover from the automatic shift mode to the manual shift mode has been performed via the shift lever 74, the mode changeover switch 76, or the like. When this determination in S7 is negative, the present routine is thereby terminated. On the other hand, when the determination in S7 is positive, changeover control from the automatic shift mode to the manual shift mode is performed in S8, which corresponds to the action of the first changeover means 106. Then, after shift control according the aforementioned manual shift mode is started in S9, which corresponds to the action of the manual shift control means 94, the present routine is terminated.

Figure 12:
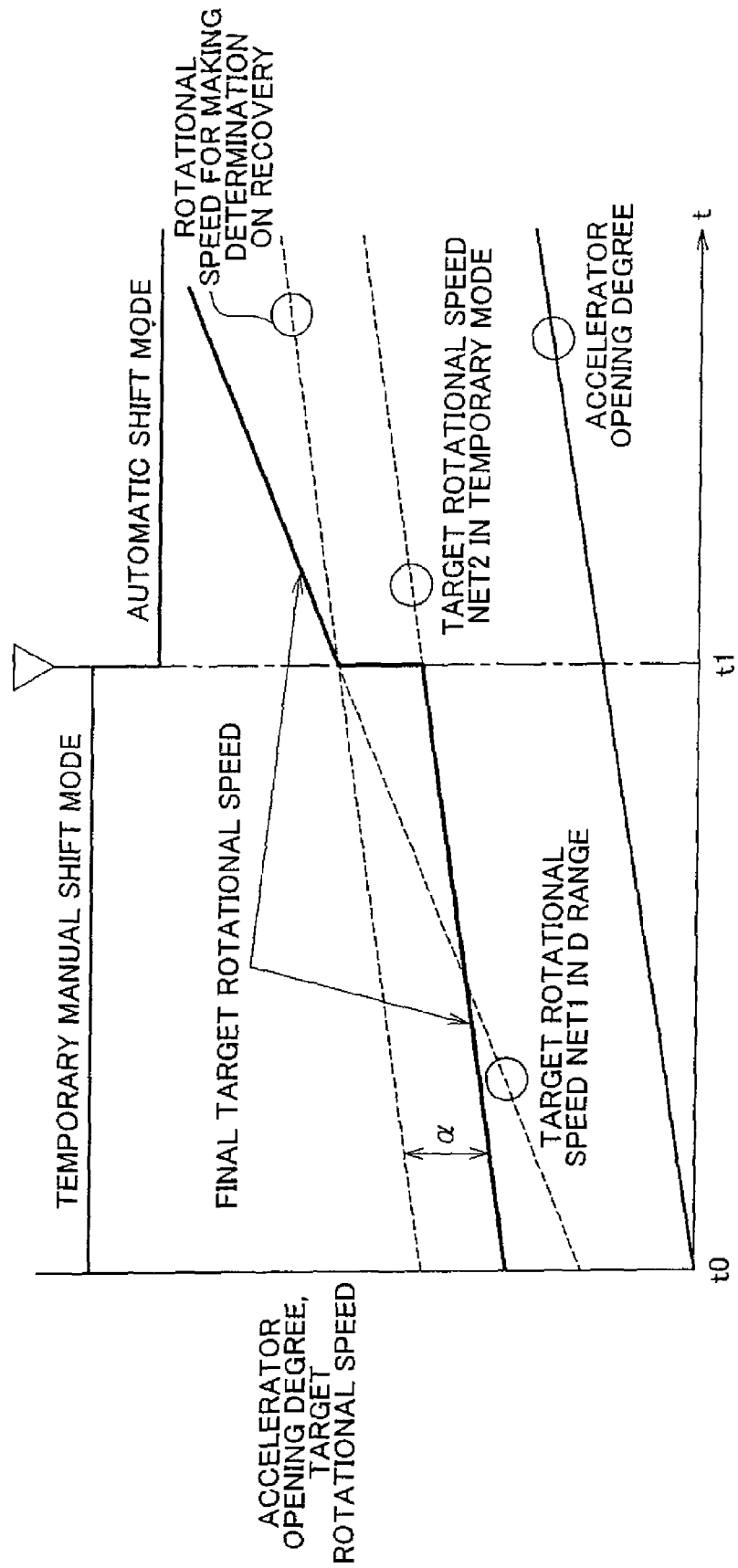
FIG. 12 is a time chart for explaining another example of changeover control from the manual shift mode to the automatic shift mode by the CVT controller of FIG. 2.

The second changeover means 108 may perform changeover control from the manual shift mode to the automatic shift mode when the first target rotational speed NET1 calculated by the related value calculating means 102 in association with the automatic shift mode is higher than the second target rotational speed NET2 calculated by the related value calculating means 102 in association with the manual shift mode by a predetermined value (a predetermined value for a determination on recovery; positive value) $\alpha$ or more. FIG. 12 is a time chart for explaining changeover control from the manual shift mode to the automatic shift mode by the second changeover means 108 in such a case. At a time point t0 shown in this FIG. 12, the continuously variable transmission 18 is in a state in which the manual shift control means 94 performs shift control, namely, in a temporary manual shift mode. At this stage, a value obtained by adding the predetermined value $\alpha$ to the second target rotational speed NET2 is higher than the first target rotational speed NET1. The relationship in magnitude between these values NET1 and NET2+$\alpha$ turns around at a time point t1. After the time point t1, the first target rotational speed NET1 is higher than the value obtained by adding the predetermined value $\alpha$ to the second target rotational speed NET2. The second changeover means 108 performs changeover control from the manual shift mode to the automatic shift mode (the D range) when the first target rotational speed NET1 becomes higher than the second target rotational speed NET2 by the predetermined value $\alpha$ or more at this time point t1. Thus, a higher target rotational speed is set as a reflection of an accelerating intention of the driver, and hence, shift control such as downshift or the like can be performed.

Figure 13:
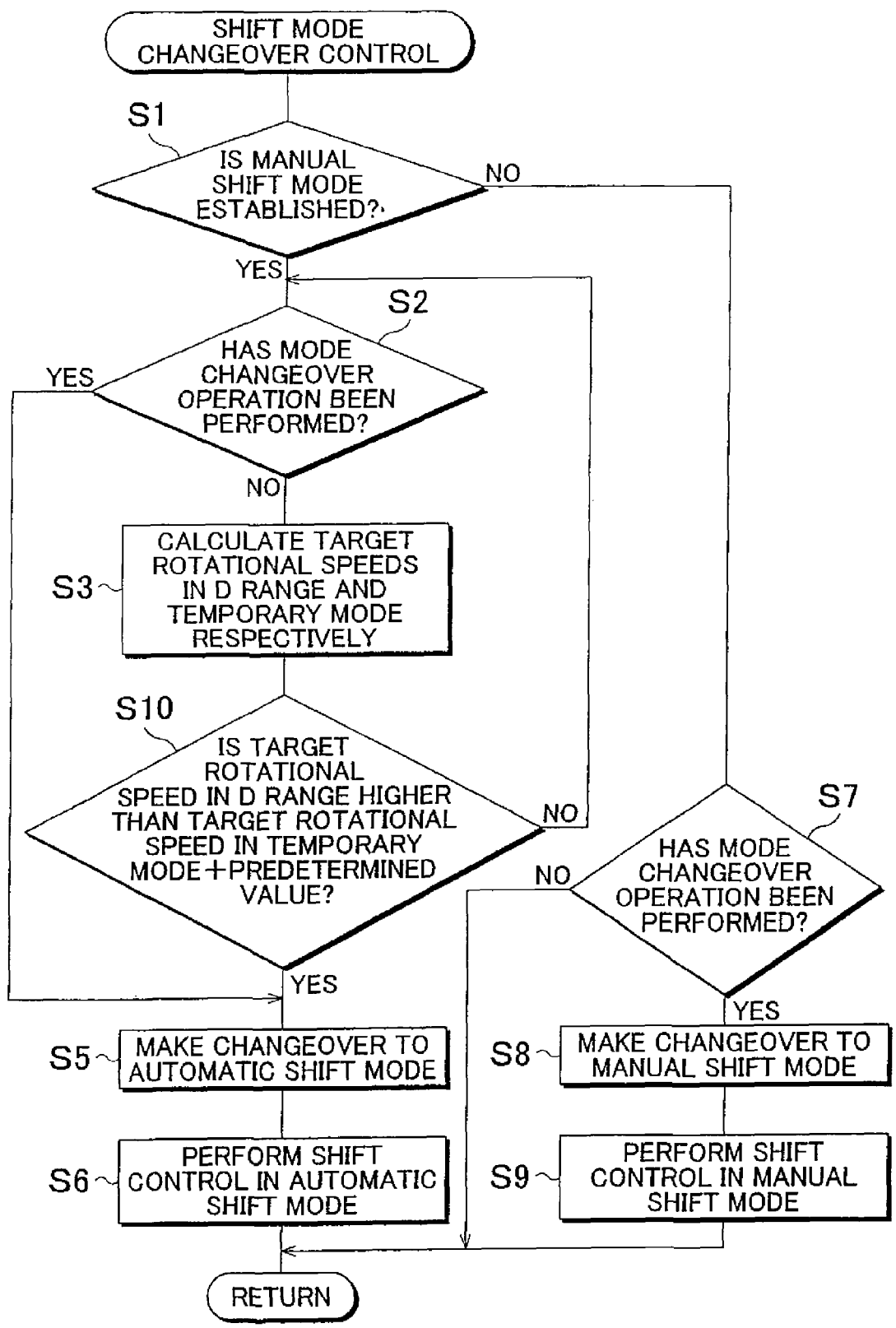
FIG. 13 is a flowchart for explaining an essential part of shift mode changeover control (control corresponding to the time chart of FIG. 12) by the CVT controller of FIG. 2.

FIG. 13 is a flowchart for explaining an essential part of shift mode changeover control (control corresponding to the time chart of FIG. 12) by the CVT controller 60. This shift mode changeover control is repeatedly performed at intervals of a predetermined period. In this control, steps common to those of the aforementioned control in FIG. 11 are denoted by the same symbols respectively and will not be described below. In this control shown in FIG. 13, it is determined in S10, which follows the aforementioned processing in S3, whether or not the first engine target rotational speed NET1 calculated in S3 is higher than the value obtained by adding the predetermined value $\alpha$ to the second engine target rotational speed NET2. When this determination in S10 is negative, the processings starting from S2 are performed again. On the other hand, the determination in S10 is positive, the aforementioned processings starting from S5 are performed.

Figure 14:
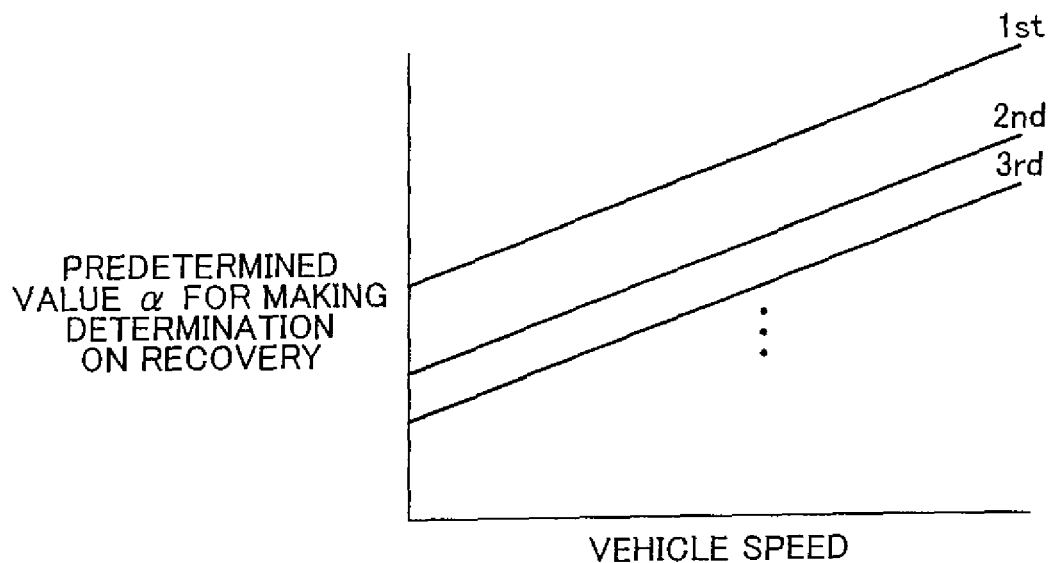
FIG. 14 is a diagram exemplifying a relationship designated in advance to set a predetermined value on the basis of a vehicle speed as to the control shown in FIG. 12.
Figure 15:
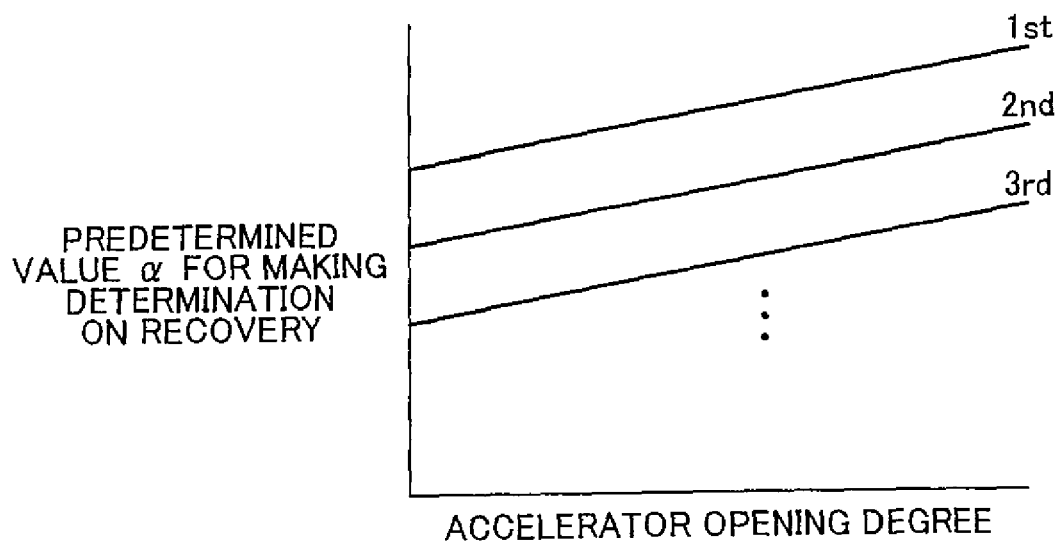
FIG. 15 is a diagram exemplifying a relationship designated in advance to set a predetermined value on the basis of an accelerator opening degree as to the control shown in FIG. 12.

The predetermined value $\alpha$ regarding changeover control from the manual shift mode to the automatic shift mode by the second changeover means 108 should not necessarily be a fixed value, but may be set on the basis of a relationship designated in advance and a running state of the vehicle. The predetermined value $\alpha$ may be individually derived on the basis of a running state of the vehicle and used for each of the shift stages in manual shift control by the manual shift control means 94. FIG. 14 exemplifies a relationship designated in advance to set the predetermined value $\alpha$ on the basis of the vehicle speed. FIG. 15 exemplifies a relationship designated in advance to set the predetermined value $\alpha$ on the basis of the accelerator opening degree. The second changeover means 108 sets the predetermined value $\alpha$ from such a relationship on the basis of a current vehicle speed, an accelerator opening degree, or the like as a running state of the vehicle, and determines on the basis of the predetermined value $\alpha$ whether or not the first target rotational speed NET1 is higher than the second target rotational speed NET2 by the predetermined value $\alpha$ or more.

Figure 16:
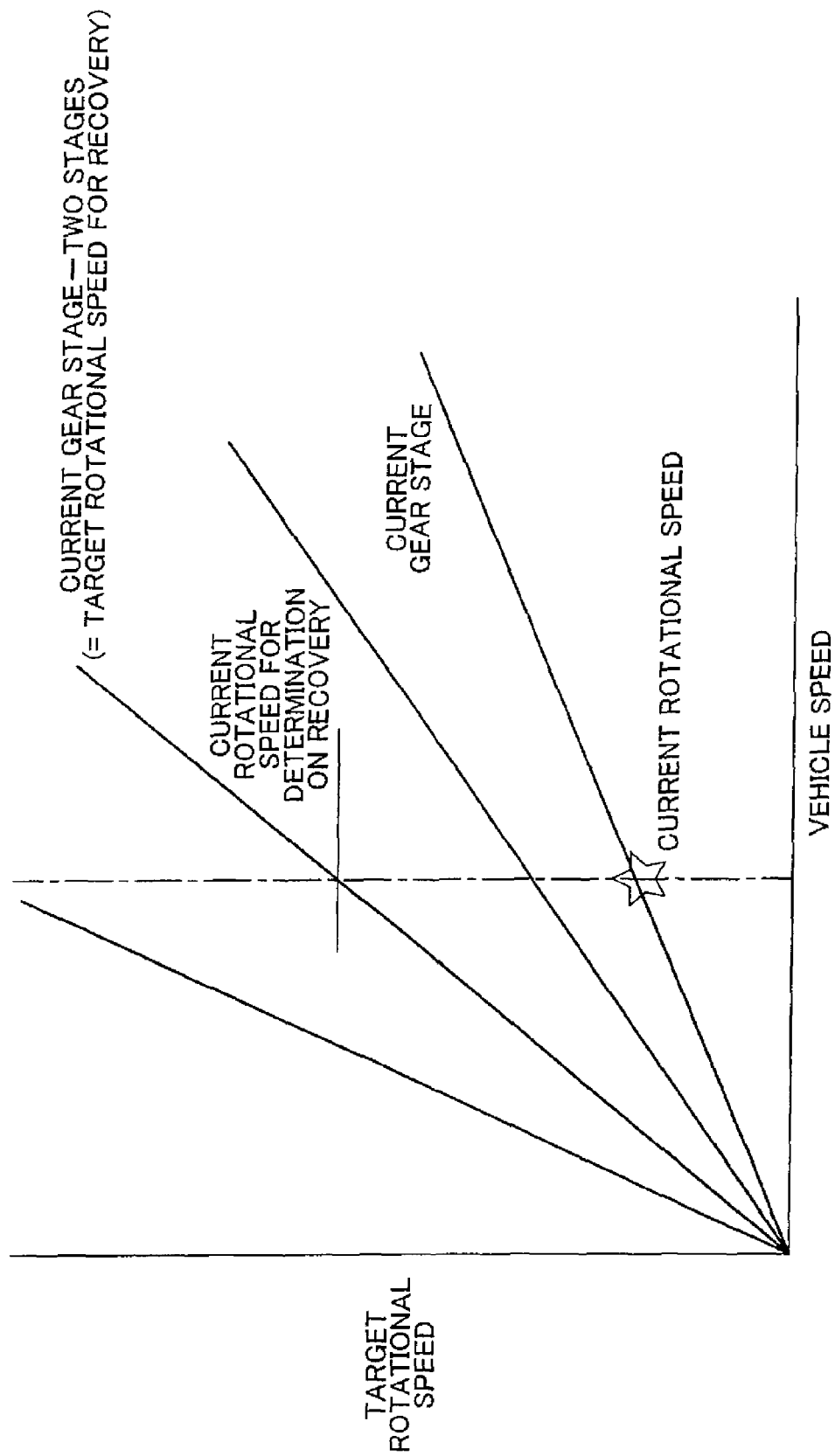
FIG. 16 is a diagram for explaining still another example of changeover control from the manual shift mode to the automatic shift mode by the CVT controller of FIG. 2.

The second changeover means 108 performs changeover control from the manual shift mode to the automatic shift mode preferably when the first target rotational speed NET1 calculated by the related value calculating means 102 in association with the automatic shift mode is higher than the second target rotational speed NET2 calculated by the related value calculating means 102 in association with the manual shift mode upon establishment of a change gear ratio that is lower than the change gear ratio $\gamma$ at a relevant time point by at least one stage. In other words, the related value calculating means 102 calculates the second target rotational speed NET2 corresponding to the gear change ratio (gear stage) that is lower than the current change gear ratio (gear stage) in the manual shift mode by at least one stage. FIG. 16 is a diagram for explaining changeover control from the manual shift mode to the automatic shift mode by the second changeover means 108 in such a case. As shown in this FIG. 16, the second changeover means 108 calculates the second target rotational speed NET2 upon establishment of (or corresponding to), for example, a gear stage that is lower than a gear stage (change gear ratio) at a relevant time point, by dint of the related value calculating means 102, and makes a determination on a changeover from the manual shift mode to the automatic shift mode on the basis of whether or not the first target rotational speed NET1 calculated by the related value calculating means 102 in association with the automatic shift mode is higher than the calculated second target rotational speed NET2.

Figure 17:
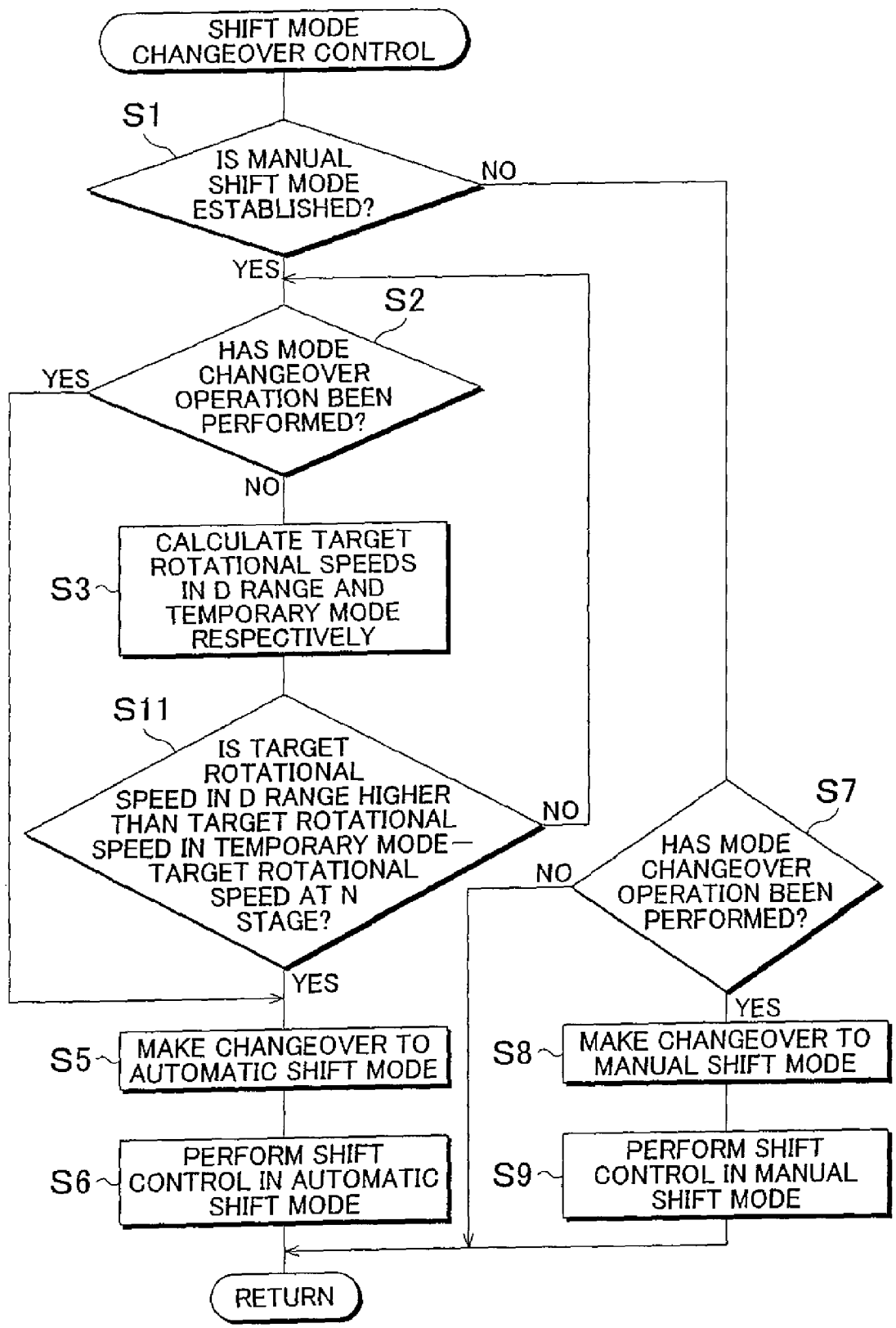
FIG. 17 is a flowchart for explaining an essential part of shift mode changeover control (control corresponding to a time chart of FIG. 16) by the CVT controller of FIG. 2.

FIG. 17 is a flowchart for explaining an essential part of shift mode changeover control (control corresponding to FIG. 16) by the CVT controller 60. This shift mode changeover control is repeatedly performed at intervals of a predetermined period. In this control, steps common to those of the aforementioned control in FIG. 11 are denoted by the same symbols respectively and will not be described below. In this control shown in FIG. 17, it is determined in S11, which follows the aforementioned processing in S3, whether or not the first engine target rotational speed NET1 calculated in S3 is higher than the second engine target rotational speed NET2 upon establishment of (or corresponding to) a change gear ratio that is lower than the change gear ratio $\gamma$ at a relevant time point by N stages. When this determination in S11 is negative, the processings starting from S2 are performed again. However, when the determination in S11 is positive, the aforementioned processings starting from S5 are performed.

As described above, according to this embodiment of the invention, the related value calculating means 102 (S3) for calculating, as to a driving force output from the engine 12 serving as a power source, driving force related values that are set larger as the driving force increases is installed. The second changeover means 108 (S5) performs changeover control from the manual shift mode to the automatic shift mode on the basis of a relationship between a first driving force related value calculated by the related value calculating means 102 in association with the automatic shift mode and a second driving force related value calculated by the related value calculating means 102 in association with the manual shift mode. Therefore, the manual shift mode can be automatically canceled on the basis of a driving force related value reflecting an accelerating intention of the driver, and changed over to the automatic shift mode. In other words, the shift control apparatus for the vehicular continuously variable transmission 18 that performs changeover control from the manual shift mode to the automatic shift mode in accordance with the accelerating intention of the driver can be provided.

The second changeover means 108 performs changeover control from the manual shift mode to the automatic shift mode when the first driving force related value calculated by the related value calculating means 102 in association with the automatic shift mode is higher than the second driving force related value calculated by the related value calculating means 102 in association with the manual shift mode. Therefore, changeover control from the manual shift mode to the automatic shift mode can be performed in a practical fashion in accordance with an accelerating intention of the driver.

The second changeover means 108 performs changeover control from the manual shift mode to the automatic shift mode when the first driving force related value calculated by the related value calculating means 102 in association with the automatic shift mode is higher than the second driving force related value upon establishment of a change gear ratio that is lower than a change gear ratio at a relevant time point by at least one stage, which is calculated by the related value calculating means 102 in association with the manual shift mode. Therefore, changeover control from the manual shift mode to the automatic shift mode can be performed in a practical fashion in accordance with an accelerating intention of the driver.

The second changeover means 108 performs changeover control from the manual shift mode to the automatic shift mode when the first driving force related value calculated by the related value calculating means 102 in association with the automatic shift mode is higher than the second driving force related value calculated by the related value calculating means 102 in association with the manual shift mode by the predetermined value $\alpha$ or more. Therefore, changeover control from the manual shift mode to the automatic shift mode can be performed in a practical fashion in accordance with an accelerating intention of the driver.

The predetermined value $\alpha$ is set from a relationship designated in advance on the basis of a running state of the vehicle. Therefore, a condition for making a changeover from the manual shift mode to the automatic shift mode can be desirably designated.

Each of the driving force related values is the target rotational speed NET of the power source. Therefore, a condition for making a changeover from the manual shift mode to the automatic shift mode can be desirably designated.

While the embodiment of the invention has been illustrated above, it is to be understood that the invention is not limited to details of the illustrated embodiment, but may be embodied with various changes, modifications or improvements, which may occur to those skilled in the art, without departing from the spirit and scope of the invention.

For example, in the foregoing embodiment of the invention, the related value calculating means 102 calculates the target rotational speed NET of the engine 12 as a driving force related value. However, the invention is not limited in this respect. For example, the related value calculating means 102 may calculate a target driving force of the vehicle, a target change gear ratio of the vehicle, or the like as a driving force related value. That is, as for a driving force output from the engine 12 serving as a power source, it is appropriate for various driving force related values that are set larger as the driving force increases to be suitably selected and used for control.

In the foregoing embodiment of the invention, the change gear ratio $\gamma$ at each of the shift stages is constant, and each of the shift stage lines is expressed as a straight line in the shift diagram shown in FIG. 7. However, the change gear ratio $\gamma$ should not necessarily be constant. A shift stage at which the change gear ratio $\gamma$ continuously changes, for example, a shift stage expressed by a straight line extending without passing the origin in FIG. 7, a curve, or the like may be designated using the vehicle speed V or the like as a parameter.

In the foregoing embodiment of the invention, the manual shift control means 94 controls the continuously variable transmission 18 such that the continuously variable transmission 18 has a total of seven shift stages (1st) to (7th). However, the total number of the shift stages may be suitably changed to, for example, six or eight.

Figure 18:
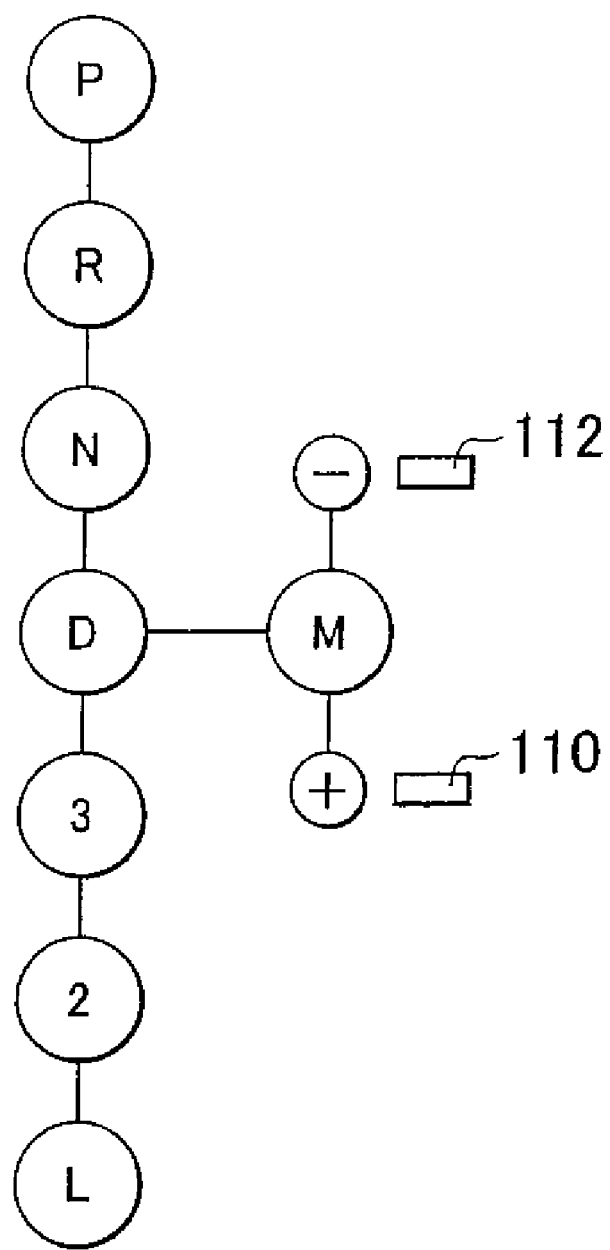
FIG. 18 is a diagram showing another example of the shift pattern of the shift lever of FIG. 2.

In the foregoing embodiment of the invention, the shift lever 74 has the shift pattern shown in FIG. 3. However, the shift lever 74 may have a shift pattern shown in, for example, FIG. 18. That is, the shift lever 74 is equipped in the longitudinal direction of the vehicle with lever positions PL including a 3 position for running forward with a limited high speed-side shift range in which the change gear ratio $\gamma$ is small, a 2 position for making automatic shifts only in a low speed-side shift range in which the change gear ratio $\gamma$ is larger than the change gear ratio $\gamma$ at the 3 position, and an L position for making automatic shifts only in a shift range located still lower than the shift range at the 2 position, in addition to the P position for parking, the R position for running backward, the N position for shutting off the transmission of power, the D position for running forward while making automatic shifts using all the shift ranges of the continuously variable transmission 18, and the M position for establishing the manual shift mode. Accordingly, when the shift lever 74 is operated from the D position to the 3 position, the 2 position, and the L position, the shift range gradually moves toward a low speed side where the change gear ratio $\gamma$ is large. As a result, the input shaft rotational speed NIN and the engine rotational speed NE are increased, and a large engine brake force is obtained.

Figure 19:
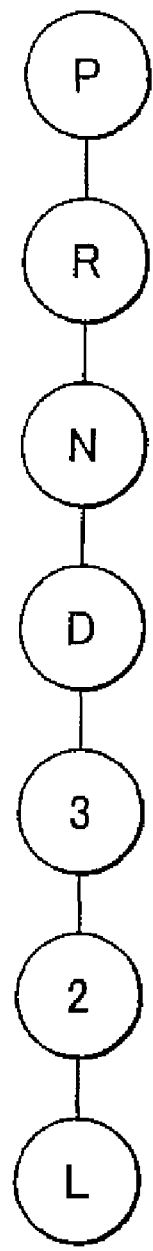
FIG. 19 is a diagram showing still another example of the shift pattern of the shift lever of FIG. 2.

In the foregoing embodiment of the invention, two components, namely, the mode changeover switch 76 and the shift lever 74 having the M position are employed. However, it is not absolutely necessary to employ both the components, and one of the components may be sufficient. That is, a mode changeover device needed for a changeover to the manual shift mode is provided as long as the shift lever 74 has the shift pattern having the M position, the "+" position, and the "−" position as lever positions as shown in, for example, FIG. 3 or FIG. 18. Therefore, the mode changeover switch 76, the upshift switches 78, and the downshift switches 80 are not absolutely required. For a similar reason, the shift lever 74 does not absolutely need to have the M position as a lever position when the mode changeover switch 76, the upshift switches 78, and the downshift switches 80 are provided. The shift lever 74 may have a shift pattern shown in, for example, FIG. 19.

In the foregoing embodiment of the invention, the push-in type switches are provided on the steering wheel 82 as the mode changeover switch 76, the upshift switches 78, and the downshift switches 80. However, the invention is not limited in this respect. An appropriate number of switches with an appropriate shape may be provided at appropriate positions as long as the driver can operate the switches. For example, the switches may be located inside an instrument panel. At least one mode changeover switch 76, at least one upshift switch 78, and at least one downshift switch 80 may be sufficient. These switches may assume the shape of a paddle-type switch.

In the foregoing embodiment of the invention, the example in which the shift control apparatus according to the invention is applied to the vehicular driving mechanism 10 equipped with the belt-type continuously variable transmission 18 as a continuously variable transmission has been described. However, the shift control apparatus according to the invention is also desirably applied to a vehicular driving mechanism equipped with, for example, a toroidal-type continuously variable transmission.

The invention claimed is:

1. A shift control apparatus for vehicular continuously variable transmissions, comprising:
a continuously variable transmission provided in a driving force transmission path between a running power source and drive wheels to continuously change a change gear ratio;
a manual shift control portion that changes the change gear ratio of the continuously variable transmission in accordance with an operation by a driver among a plurality of shift stages set stepwise in advance;
an automatic shift control portion that changes the change gear ratio of the continuously variable transmission on a basis of a running state of a vehicle;
a first changeover portion that makes, in accordance with an operation by the driver, a changeover from an automatic shift mode in which the automatic shift control portion performs shift control to a manual shift mode in which the manual shift control portion performs shift control;
a second changeover portion that makes a changeover from the manual shift mode to the automatic shift mode; and
a related value calculating portion that calculates a first driving force related value in association with the automatic shift mode and a second driving force related value in association with the manual shift mode, the first driving force related value and the second driving force related value being set larger as a driving force output from the running power source increases,
wherein the second changeover portion makes a changeover from the manual shift mode to the automatic shift mode on a basis of a relationship between the first driving force related value and the second driving force related value.

2. The shift control apparatus according to claim 1, wherein the second changeover portion makes a changeover from the manual shift mode to the automatic shift mode when the first driving force related value is larger than the second driving force related value.

3. The shift control apparatus according to claim 1, wherein the second changeover portion makes a changeover from the manual shift mode to the automatic shift mode when the first driving force related value is larger than the second driving force related value, which corresponds to a shift stage that is lower than a current shift stage in the manual shift mode by at least one stage.

4. The shift control apparatus according to claim 1, wherein the second changeover portion makes a changeover from the manual shift mode to the automatic shift mode when the first driving force related value is larger than the second driving force related value by a predetermined value.

5. The shift control apparatus according to claim 4, wherein the predetermined value is set on a basis of a running state of the vehicle.

6. The shift control apparatus according to claim 1, wherein the first driving force related value and the second driving force related value are target rotational speeds of the running power source.

7. The shift control apparatus according to claim 1, wherein the related value calculating portion calculates the second driving force related value on a basis of a relationship designated in advance between the plurality of the shift stages in the manual shift mode and driving force related values and a current shift stage.

8. The shift control apparatus according to claim 5, wherein the predetermined value is set on a basis of a relationship designated in advance between a plurality of running states of the vehicle and a plurality of predetermined values and a current running state of the vehicle.

9. The shift control apparatus according to claim 4, wherein the related value calculating portion calculates the second driving force related value, which corresponds to a shift stage that is lower than a current shift stage in the manual shift mode by at least one stage.

10. The shift control apparatus according to claim 1, wherein the related value calculating portion calculates the first driving force related value on a basis of a relationship designated in advance between a plurality of running states of the vehicle in the automatic shift mode and a plurality of driving force related values and a current running state of the vehicle, and calculates the second driving force related value on a basis of a relationship designated in advance between a plurality of running states of the vehicle in the manual shift mode and a plurality of driving force related values and the current running state of the vehicle.

11. The shift control apparatus according to claim 10, wherein the running states of the vehicle are accelerator operation amounts, accelerator opening degrees, or electronic throttle valve opening degrees.

12. The shift control apparatus according to claim 8, wherein the running states of the vehicle are vehicle speeds or accelerator opening degrees.

13. The shift control apparatus according to claim 2, wherein the first driving force related value and the second driving force related value are target rotational speeds of the running power source.

14. The shift control apparatus according to claim 3, wherein the first driving force related value and the second driving force related value are target rotational speeds of the running power source.

15. The shift control apparatus according to claim 4, wherein the first driving force related value and the second driving force related value are target rotational speeds of the running power source.

16. The shift control apparatus according to claim 5, wherein the first driving force related value and the second driving force related value are target rotational speeds of the running power source.

* * * * *